United States Patent
Mitchell

(10) Patent No.: US 9,453,446 B2
(45) Date of Patent: Sep. 27, 2016

(54) CONSTANT MASS FLOW INJECTION SYSTEM

(71) Applicant: Cummins Emission Solutions, Inc., Columbus, IN (US)

(72) Inventor: Douglas A. Mitchell, Indianapolis, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 115 days.

(21) Appl. No.: 14/520,127

(22) Filed: Oct. 21, 2014

(65) Prior Publication Data
US 2016/0108789 A1    Apr. 21, 2016

(51) Int. Cl.
  *F01N 3/22*   (2006.01)
  *F01N 3/32*   (2006.01)
  *F01N 3/20*   (2006.01)
  *F02B 37/16*  (2006.01)

(52) U.S. Cl.
  CPC ............... *F01N 3/225* (2013.01); *F01N 3/208* (2013.01); *F01N 3/32* (2013.01); *F02B 37/164* (2013.01); *F01N 2900/0414* (2013.01); *F01N 2900/1812* (2013.01)

(58) Field of Classification Search
  CPC ...... F01N 3/2066; F01N 3/208; F01N 3/225; F01N 3/32; F01N 2610/02; F01N 2610/08
  See application file for complete search history.

(56) References Cited

U.S. PATENT DOCUMENTS

| | | | | |
|---|---|---|---|---|
| 6,167,698 B1* | 1/2001 | King | ................. | B01D 53/9431 60/274 |
| 2004/0098975 A1* | 5/2004 | van Nieuwstadt | . | B01D 53/9431 60/286 |

FOREIGN PATENT DOCUMENTS

| | | | | |
|---|---|---|---|---|
| DE | 10150518 C1 * | 5/2003 | ......... | B01D 53/9431 |
| FR | 2979382 A1 | 3/2013 | | |
| FR | 2991380 A1 | 12/2013 | | |
| WO | WO-2013/109258 A1 | 7/2013 | | |

* cited by examiner

*Primary Examiner* — Audrey K Bradley
(74) *Attorney, Agent, or Firm* — Foley & Lardner LLP

(57) ABSTRACT

Exhaust aftertreatment assemblies and methods of manufacturing and operating exhaust aftertreatment assemblies. The exhaust aftertreatment assembly includes a reductant delivery device, a reductant source fluidly coupled to the reductant delivery device, a mixing chamber positioned between the reductant delivery device and the reductant source and thereby fluidly coupling the reductant source to the reductant delivery device, and a compressed air source fluidly coupled to the mixing chamber upstream of the mixing chamber with respect to the reductant delivery device. The compressed air source provides compressed air to mix with reductant in the mixing chamber.

16 Claims, 4 Drawing Sheets

Design for maximum required NH₃ gas delivery

- Each hole emits the same mass flow of reductant
- UI maximized $m_1 = m_2 = m_3 = \frac{1}{3} mfNH_3$

CONSTANT MASS FLOW INJECTION SYSTEM

TECHNICAL FIELD

The present disclosure relates to exhaust aftertreatment systems.

BACKGROUND

Efforts to increase efficiency and improve environmental impacts of internal combustion engine have led to providing internal combustion engines with systems that treat the exhaust stream produced by such engines. Aftertreament exhaust systems may include a variety of components, such as filters and catalysts for reducing contaminants or targeted by-products in the exhaust. Some exhaust treatment systems include a reductant delivery device, for example an injector, placed in the exhaust stream. The reductant delivery device is placed in the exhaust stream of the aftertreatment system to deliver reductant, such as gaseous $NH_3$ or urea containing liquid $NH_3$, for NOx reduction. The reductant delivery device may include a lattice of tubes with varying diameter apertures or placement from the central axis. This is a passive device that delivers a pressurized stream of reductant from a source. The reductant delivery device is designed to maximize the distribution of the reductant in the cross-sectional area of the exhaust stream: The reductant delivery device may be designed to deliver a reductant to the exhaust to reduce or transfer certain components of the exhaust.

Changes in engine performance under certain conditions causes variability in the exhaust stream and warrants variation in the delivery of the reductant. However, passive reductant delivery devices may be designed for proper operation under specific constant conditions. Specifically, the mass flow of the reductant for treating the exhaust stream is dependent on the molar ratio of $NH_3$ required to reduce NOx; therefore, it is not constant. However, when the reductant delivery device is designed, it must be designed for the maximum flow rate of reductant to prevent the apertures from throttling the release of the reductant into the gas stream. If this happens, then there will be a reductant deficit in the exhaust stream and NOx will not be adequately reduced.

SUMMARY

Various embodiments disclosed herein provide exhaust aftertreatment assemblies and methods of manufacturing and operating exhaust aftertreatment assemblies.

Various embodiments provide an exhaust aftertreatment assembly including a reductant delivery device and a reductant source fluidly coupled to the reductant delivery device. The exhaust aftertreatment assembly includes a mixing chamber fluidly coupled to the reductant delivery device. The mixing chamber is positioned between the reductant delivery device and the reductant source and thereby fluidly couples the reductant source to the reductant delivery device. The exhaust aftertreatment assembly includes a compressed air source fluidly coupled to the mixing chamber upstream of the mixing chamber with respect to the reductant delivery device. The compressed air source provides compressed air so as to mix with reductant in the mixing chamber.

Further embodiments provide for engine assembly including an internal combustion engine. An exhaust aftertreatment system is fluidly coupled to the internal combustion engine. A reductant delivery device fluidly is coupled to the exhaust aftertreatment system. A reductant source is fluidly coupled to the reductant delivery device. A mixing chamber is positioned between the reductant delivery device and the reductant source. The mixing chamber fluidly couples the reductant source to the reductant delivery device. A compressed air source is fluidly coupled to the mixing chamber upstream of the mixing chamber with respect to the reductant delivery device. The compressed air source provides compressed air to mix with reductant in the mixing chamber. In particular embodiments, the engine assembly includes a controller configured to cause a quantity of compressed air from the compressed air source to mix with the reductant released from the reductant source in the mixing chamber.

Still further embodiments provide for a method of treating engine exhaust comprising. A difference between a predetermined optimized mass flow rate for a reductant delivery device fluidly coupled to an exhaust aftertreatment system and a commanded reductant mass flow rate of reductant from a reductant source fluidly coupled to the exhaust aftertreatment system is determined. The commanded reductant mass flow rate is determined to treat an exhaust stream of exhaust in the exhaust aftertreatment system by injection of the reductant via the reductant delivery device into the exhaust aftertreatment system. The predetermined optimized mass flow rate is determined to produce equalized fluid flow from a plurality of injection apertures in the reductant delivery device. Based on the determined difference and in response to a release of the reductant, it is caused to mix, in a mixing chamber upstream of the reductant delivery device, of a quantity of compressed air from a compressed air source with the reductant released from the reductant source pursuant to the commanded reductant mass flow rate of reductant.

Additional embodiments provide for a control system for treating an engine exhaust stream. The control system includes a sensing module electrically coupled to at least one regulator configured to cause release of reductant from a reductant source fluidly coupled to the exhaust aftertreatment system at a commanded reductant mass flow rate. The sensing module is configured to determine a difference between a predetermined optimized mass flow rate for a reductant delivery device fluidly coupled to the exhaust aftertreatment system and the commanded reductant mass flow rate of reductant from the reductant source. The predetermined optimized mass flow rate is determined to produce equalized fluid flow from a plurality of injection apertures in the reductant delivery device. An actuation module is configured to cause a quantity of compressed air from a compressed air source to mix with the reductant released from the reductant source.

In yet further embodiments, a method of treating engine exhaust is provided. The method includes mixing a reductant with compressed air in a mixing chamber fluidly coupled to a reductant delivery device upstream of the reductant delivery device. The reductant and compressed air mixture is transferred from the mixing chamber to the reductant delivery device. The reductant and compressed air mixture is injected into an exhaust aftertreatment system coupled to an internal combustion engine. In particular embodiments, the mixing of the reductant with compressed air in the mixing chamber includes determining a quantity of compressed air required to increase the reductant and compressed air mixture to a predetermined quantity.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive exhaust aftertreatment assemblies and methods of operating exhaust aftertreatment assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
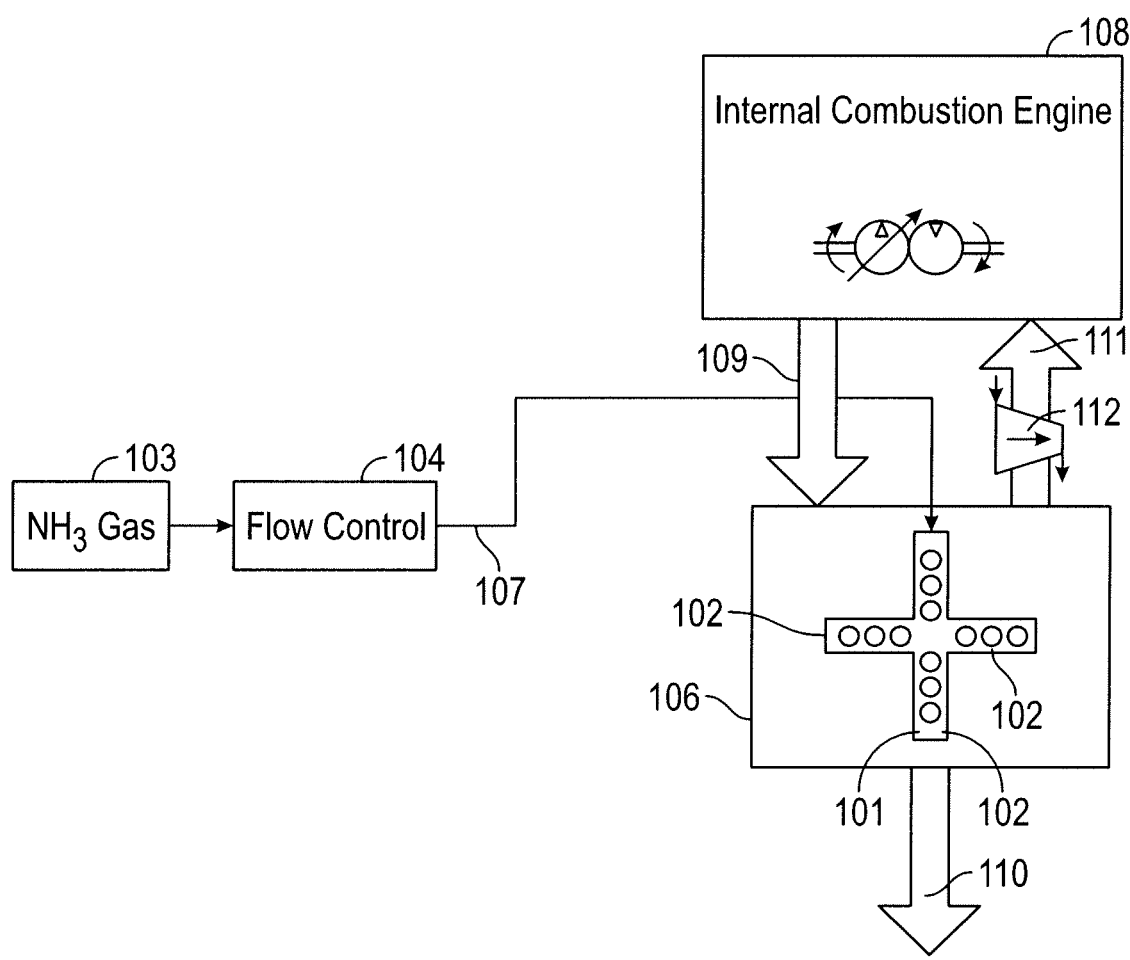
FIG. 1 is a schematic diagram of an exemplary exhaust aftertreatment assembly.

FIG. 1 is a schematic diagram of an exemplary exhaust aftertreatment assembly. An exhaust aftertreatment system 106 is coupled to an internal combustion engine 108, such as a diesel engine. The exhaust aftertreatment system 106 is coupled to the internal combustion engine 108 via an exhaust conduit 109, for example an exhaust manifold coupled to an exhaust port of the internal combustion engine 108. During operation, the internal combustion engine 108 expels exhaust gas through the exhaust conduit 109 for transmission to the exhaust aftertreatment system 106. Generally, the exhaust aftertreatment system 106 is configured to remove various chemical and particulate emissions present in the exhaust gas.

The exhaust aftertreatment system 106 may include a selective catalytic reduction (SCR) catalyst. The SCR catalyst is configured to reduce $NO_x$ into less harmful emissions, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst. The ammonia is then introduced at the inlet face of the SCR catalyst, flows through the catalyst, and is consumed in the $NO_x$ reduction process. Any unconsumed ammonia exiting the SCR catalyst (e.g., "ammonia slip") can be reduced to $N_2$ and other less harmful or less noxious components using an ammonia oxidation catalyst.

The exhaust aftertreatment system 106 receives reductant, such as gaseous $NH_3$ or urea containing liquid $NH_3$, from a reductant tank 103. The reductant is used to process and reduce the contaminants or other undesirable constituents in the exhaust flow received from the engine 108. The reductant from the reductant tank 103 to injected into the exhaust aftertreatment system 106 via a reductant delivery device, in the form of an injector 101 in FIG. 1. It should be understood that, although the reductant delivery device is described and depicted in the form of an injector in FIG. 1 and elsewhere, other forms of reductant delivery devices may also be used in the various implementations described herein.

Control of the release of the reductant from the reductant tank 103 to the injector 101 is managed by a flow controller 104, which may include one or more valves and/or one or more electrical controllers configured to actuate the valve. The flow controller 104 is coupled to the injector 101 via a fluid conduit 107. The exhaust aftertreatment system 106 may be coupled to an exhaust pipe 110 and or an exhaust gas recirculation (EGR) line 111, which may include a turbo or turbine 112.

Figure 2A:
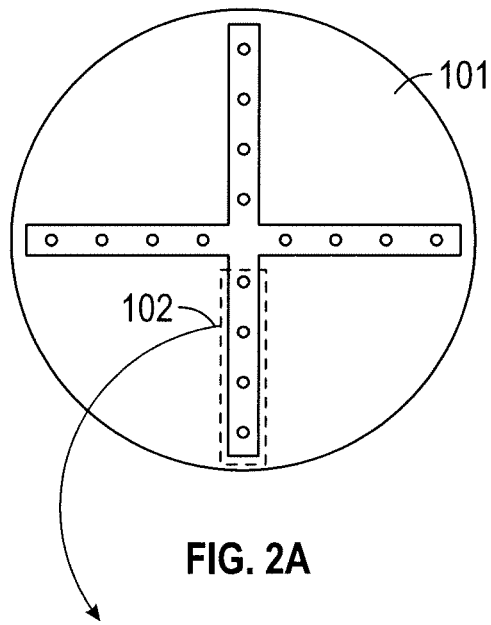
FIGS. 2A and 2B illustrate an injector device for an exhaust aftertreatment assembly.
Figure 2B:
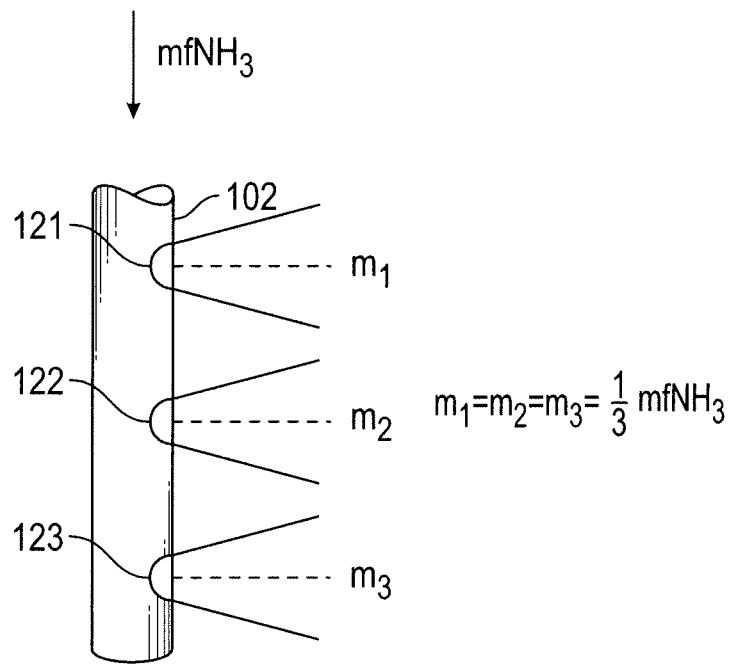

FIGS. 2A and 2B illustrate a representative injector device for an exhaust aftertreatment assembly. The injector 101 is placed in the exhaust stream of the aftertreatment system to deliver the reductant (such as $NH_3$ gas) for NOx reduction. The injector 101 includes a lattice of injector tubes 102 with varying diameter apertures 121-123 or placement from the central axis. The injector 101 is a passive device that delivers a pressurized stream of reductant from the reductant tank 103. The injector 101 is designed to maximize the distribution of the $NH_3$ gas in the cross-sectional area of the exhaust stream. The mass flow of the reductant is variable and depends on the molar ratio of $NH_3$ required to reduce NOx. When the injector 101 is designed, it is designed for the maximum flow rate of reductant. Otherwise, the apertures 121-123 will throttle the release of the reductant into the exhaust gas stream. If this happens, then there will be a reductant deficit in the exhaust stream and the NOx in the exhaust gas stream will not be adequately reduced. Accordingly, the injector 101 is designed to achieve a constant mass flow of reductant under the maximum flow rate condition.

Figure 3:
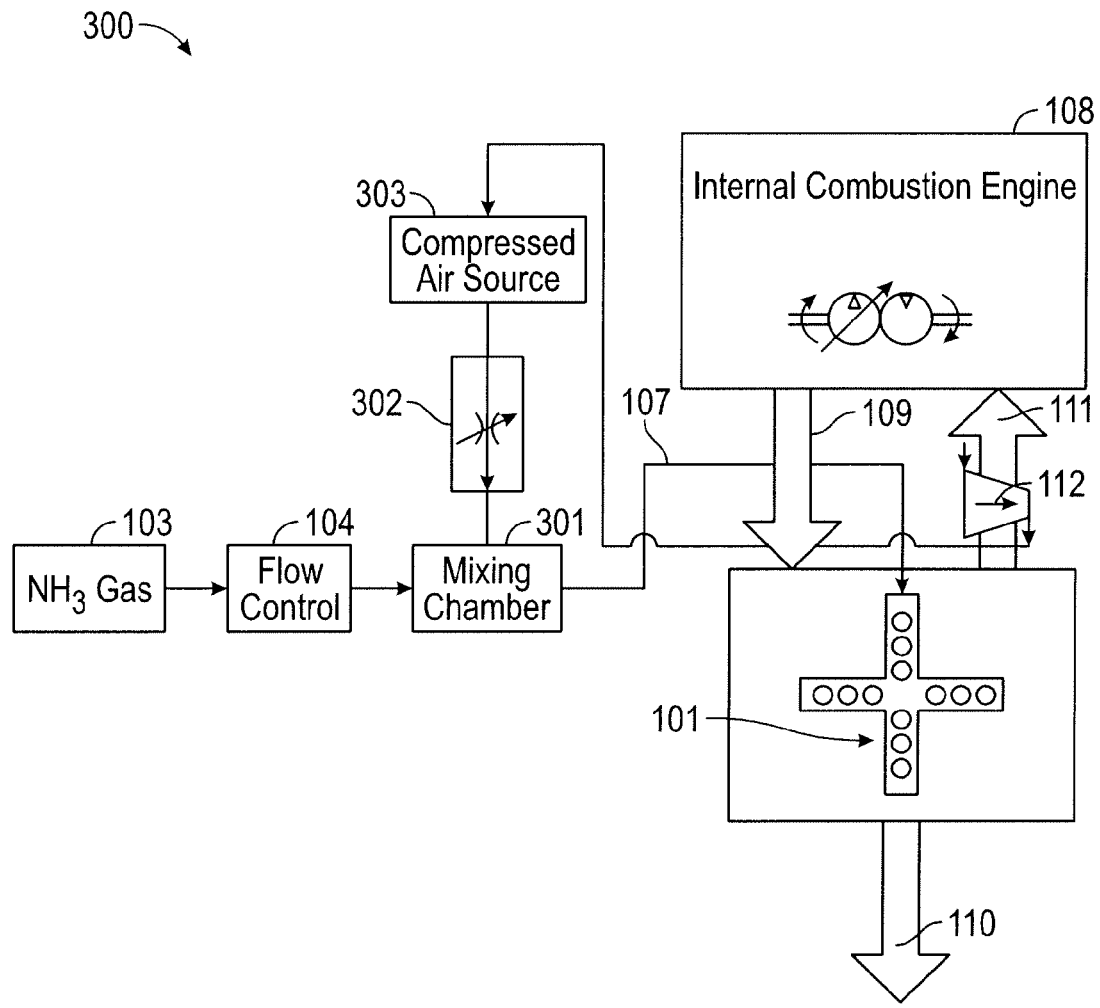
FIG. 3 is a schematic diagram of an exhaust aftertreatment assembly, in accordance with example embodiments.

FIG. 3 is a schematic diagram of an exhaust aftertreatment assembly, in accordance with example embodiments. As noted herein, under conditions where the exhaust stream requires less than the maximum flow rate of reductant, the flow controller 104 may be configured to command release of less reductant than the maximum flow rate; however, doing so causes the flow rate across the plurality of apertures 121-123 to be unequal. To prevent the variability in flow rate across the plurality of apertures 121-123 when reductant is expelled at a flow less than the rate that is maximum flow rate, the exhaust aftertreatment assembly 300, includes a mixing chamber 301 fluidly coupled to the injector 101. The mixing chamber 301 is positioned between the injector 101 and the reductant tank 103. The mixing chamber 301, which may be passive or active in different implementations, thereby fluidly couples the reductant tank 103 to the injector 101. A compressed air source 303 is fluidly coupled to the mixing chamber 301 upstream of the mixing chamber 301 with respect to the injector 101.

Flow from the compressed air source 303 is controlled via a regulator 302. The regulator 302 may include a valve and may include an electronic controller configured to actively control the flow rate of fluid through the regulator 302, for example by varying the duration that the valve is open and/or varying the flow rate permitted by the valve. The regulator 302 may include a timer. The regulator may be coupled to one or more sensors, including, but not limited to, a pressure sensor positioned in the mixing chamber and a flow sensor coupled to the fluid conduit 107 or flow controller 104. As discussed further herein, the flow rate of compressed air from the compressed air source 303 into the mixing chamber 301 for mixing with the reductant from the reductant tank 103, may be controlled based on and in response to a commanded quantity of reductant released from the reductant tank 103. The commanded quantity may be based on the flow condition of exhaust flowing into and/or through the exhaust aftertreatment system 106. The commanded quantity may be determined indirectly from the flow controller 104.

In example embodiments, the compressed air source 303 includes an air tank coupled to an auxiliary compressor. In example embodiments, the compressed air source 303 receives compressed air from a turbine 112 coupled to the internal combustion engine 108 or coupled to one or more exhaust components of the internal combustion engine 108 (such as the EGR line 111). In example embodiments, the compressed air source 303 may receive a compressed exhaust air. The compressed exhaust air may be cleaned by one or more cleaners configured to remove ash, soot, or other contaminants from the exhaust air.

Figure 4:
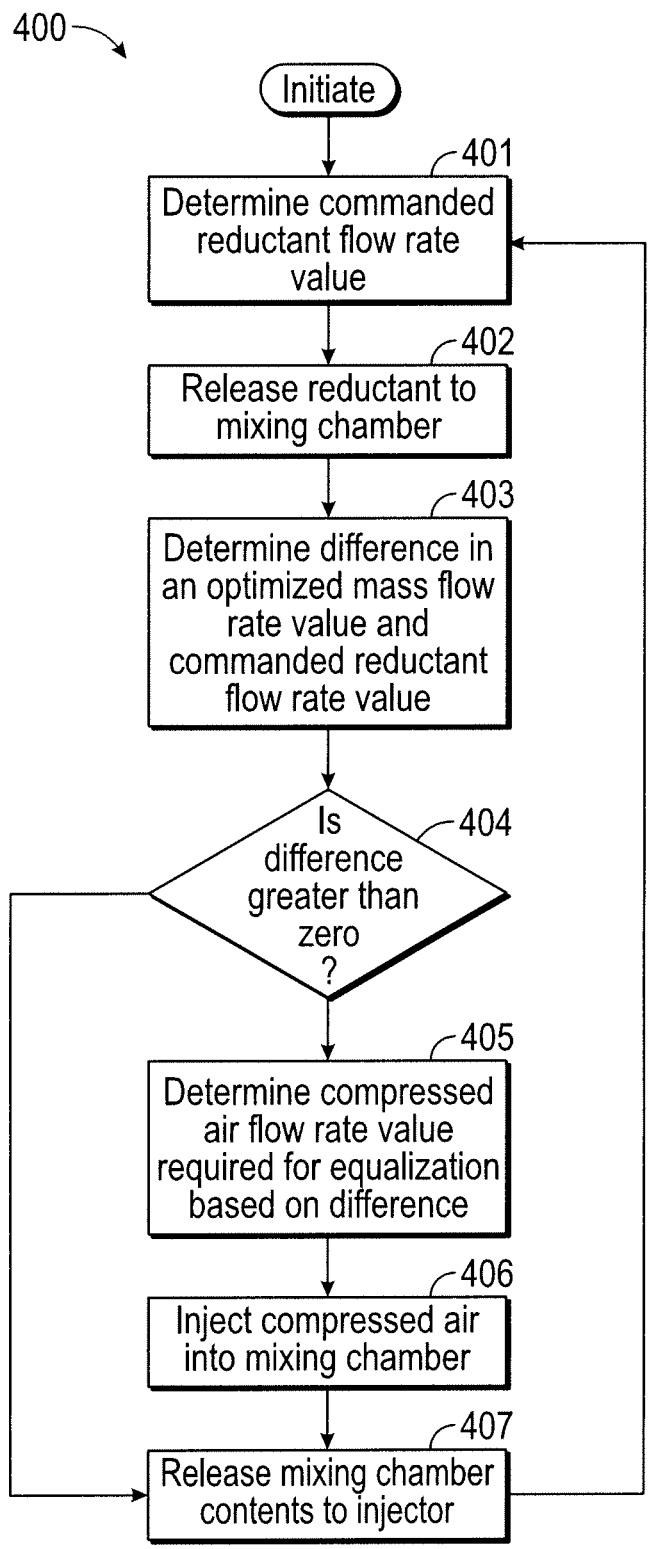
FIG. 4 is a flow diagram showing an exemplary method of operating an exhaust aftertreatment assembly, in accordance with example embodiments.

FIG. 4 is a flow diagram showing an exemplary method of operating an exhaust aftertreatment assembly, in accordance with example embodiments. An exhaust aftertreatment control system 400 may be controlled by one or more engine control units to determine and control the flow rate from the compressed air source 303. At 401, the exhaust aftertreatment control system 400 determines a commanded reductant flow rate value or quantity. The commanded reductant flow rate value includes the amount of reductant determined warranted to treat the exhaust stream of exhaust presently in or headed to the exhaust aftertreatment system 106. The commanded reductant flow rate value may be determined based on conditions including, but not limited to, exhaust flow rate into the exhaust aftertreatment system, aftertreatment exhaust conditions, engine parameters such as rotational speed or torque, transmission gear, and or exhaust temperature, exhaust back pressure (when there is buildup), vehicle speed, $NH_3$ slip off the back of the catalyst, and $NH_3$ coverage over the SCR catalyst. In example embodiments, the exhaust aftertreatment control system 400 may receive the commanded reductant flow rate value from one or more controllers or sensors.

In response to the commanded reductant flow rate value, at 402 reductant, such as $NH_3$, is released from the reductant tank 103, via the flow controller 104 for mixing in the mixing chamber 301 downstream of the reductant tank 103 and upstream of the injector 112 positioned in direct fluid communication with the engine exhaust aftertreatment system 106. At 403, the exhaust aftertreatment control system 400 compares the commanded reductant flow rate value to a predetermined optimized mass flow rate value for an injector or maximum flow rate for the injector. The predetermined optimized mass flow rate value is the flow rate determined to produce equalized fluid flow from a plurality of injection apertures in the injector 101. At 404, the exhaust aftertreatment control system 400 determines a difference between the predetermined optimized mass flow rate value and the commanded reductant mass flow rate value. If the difference is greater than zero (or alternatively if the commanded reductant mass flow rate is less than the predetermined optimized mass flow rate), the exhaust aftertreatment control system 400 determines based on the difference the quantity of compressed air required for mixing with the reductant to bring the mixture to a quantity producing equalized fluid flow from the injection apertures of the injector 101. In an alternative embodiment, the exhaust aftertreatment control system 400 determines if the difference is greater than a predetermined threshold and injects compressed air in response to the difference being greater than the predetermined threshold. The quantity of compressed air and reductant correspond to the predetermined optimized mass flow rate quantity. At 405, the quantity of compressed air determined for equalization is released into the mixing chamber for mixing with the reductant. At 406, the mixture of compressed air and reductant is released to the injector for injection into the exhaust aftertreatment system 106.

In certain embodiments, the exhaust aftertreatment control system 400 further includes a controller structured to perform certain operations to cause actuation of the regulator and cause mixing of compressed air with the released quantity of reductant commanded based on the instant exhaust flow conditions. The controller may also be configured to cause actuation of the flow controller releasing the reductant from the reductant tank. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes sensor modules configured to determine a fluid flow value, a pressure value and/or a temperature value, of reductant and/or compressed air.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 4.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of treating engine exhaust comprising:
   mixing a reductant with compressed air in a mixing chamber fluidly coupled to a reductant delivery device upstream of the reductant delivery device, the compressed air comprising a recirculated exhaust gas;
   transferring the reductant and compressed air mixture from the mixing chamber to the reductant delivery device; and
   injecting the reductant and compressed air mixture into an exhaust aftertreatment system coupled to an internal combustion engine.

2. The method of claim 1, wherein the mixing of the reductant with compressed air in the mixing chamber comprises determining a quantity of compressed air required to increase the reductant and compressed air mixture to a predetermined quantity.

3. The method of claim 1, wherein the reductant delivery device comprises a reductant injector.

4. An exhaust aftertreatment assembly, comprising:
   a reductant delivery device;
   a reductant source fluidly coupled to the reductant delivery device;
   a mixing chamber fluidly coupled to the reductant delivery device, the mixing chamber positioned between the reductant delivery device and the reductant source and thereby fluidly coupling the reductant source to the reductant delivery device; and
   a compressed air source fluidly coupled to the mixing chamber upstream of the mixing chamber with respect to the reductant delivery device, the compressed air source providing compressed air so as to mix with reductant in the mixing chamber, the compressed air comprising at least a portion of an exhaust gas flowing through the aftertreatment system recirculated to the compressed air source.

5. The exhaust aftertreatment assembly of claim 4, wherein the reductant source includes a tank of gaseous $NH_3$.

6. The exhaust aftertreatment assembly of claim 4, wherein the reductant delivery device includes a lattice of tubes including a plurality of openings therein.

7. The exhaust aftertreatment assembly of claim 4, further comprising a pressure sensor positioned in the mixing chamber, the pressure sensor configured to provide a pressure reading of fluid in the mixing chamber, the pressure reading configured to control injection of compressed air from the compressed air source into the mixing chamber.

8. The exhaust aftertreatment assembly of claim 4, wherein the reductant delivery device comprises a reductant injector.

9. The exhaust aftertreatment assembly of claim 4, further comprising at least one sensor configured to sense a value correlated to a quantity of reductant released from the reductant source.

10. The exhaust aftertreatment assembly of claim 9, further comprising a controller configured to cause a quantity of compressed air from the compressed air source to mix with the reductant released from the reductant source in the mixing chamber based on the sensed value.

11. The exhaust aftertreatment assembly of claim 10, wherein the causing of a quantity of compressed air from the compressed air source to mix with the reductant includes venting recirculated at least the portion of the exhaust gas compressed by a turbine to the compressed air source.

12. The exhaust aftertreatment assembly of claim 10, further comprising a regulator coupled in a fluid flow path between the mixing chamber and the compressed air source, the regulator configured to cause a quantity of compressed air from the compressed air source to mix with a quantity of reductant released from the reductant source, the regulator electrically coupled to the controller.

13. The exhaust aftertreatment assembly of claim 12, wherein the regulator includes a valve operable to control a flow rate of compressed air from the compressed air source to the mixing chamber.

14. An engine assembly, comprising:
an internal combustion engine;
an exhaust aftertreatment system fluidly coupled to the internal combustion engine;
a reductant delivery device fluidly coupled to the exhaust aftertreatment system;
a reductant source fluidly coupled to the reductant delivery device;
a mixing chamber positioned between the reductant delivery device and the reductant source, the mixing chamber fluidly coupling the reductant source to the reductant delivery device; and
a compressed air source fluidly coupled to the mixing chamber upstream of the mixing chamber with respect to the reductant delivery device, the compressed air source providing compressed air to mix with reductant in the mixing chamber, the compressed air comprising at least a portion of an exhaust gas flowing through the aftertreatment system recirculated to the compressed air source.

15. The engine assembly of claim 14, further comprising a controller configured to cause a quantity of compressed air from the compressed air source to mix with the reductant released from the reductant source in the mixing chamber.

16. An exhaust aftertreatment assembly, comprising:
a reductant delivery device;
a reductant source fluidly coupled to the reductant delivery device;
a mixing chamber fluidly coupled to the reductant delivery device, the mixing chamber positioned between the reductant delivery device and the reductant source and thereby fluidly coupling the reductant source to the reductant delivery device; and
a compressed air source fluidly coupled to the mixing chamber upstream of the mixing chamber with respect to the reductant delivery device, the compressed air source providing compressed air so as to mix with reductant in the mixing chamber;
at least one sensor configured to sense a value correlated to a quantity of reductant released from the reductant source; and
a controller configured to cause a quantity of compressed air from the compressed air source to mix with the reductant released from the reductant source in the mixing chamber based on the sensed value,
wherein the causing of the quantity of compressed air from the compressed air source to mix with the reductant includes venting recirculated exhaust gas compressed by a turbine to the compressed air source.

* * * * *